June 7, 1960
L. A. CARLSMITH ET AL
2,939,745
DISCHARGE APPARATUS
Filed July 2, 1958
2 Sheets-Sheet 1
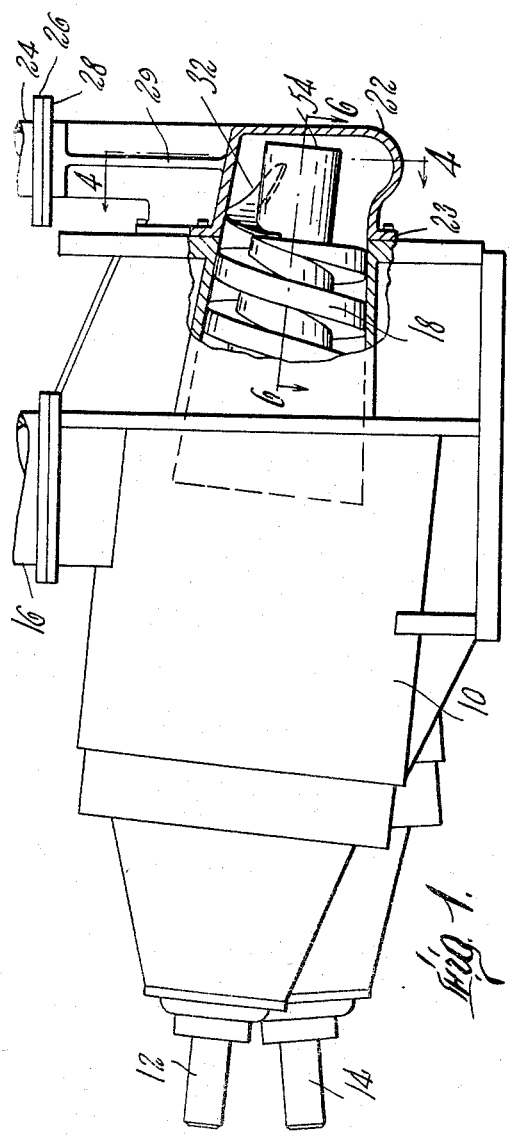
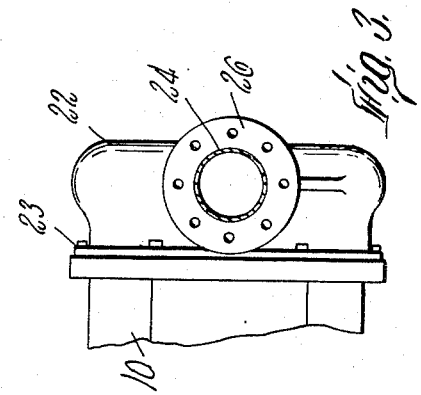
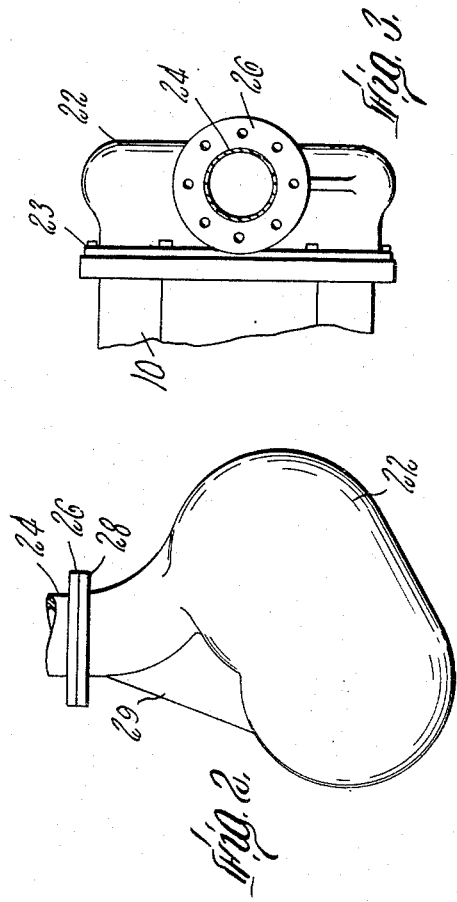

June 7, 1960 L. A. CARLSMITH ET AL 2,939,745
DISCHARGE APPARATUS
Filed July 2, 1958
2 Sheets-Sheet 2
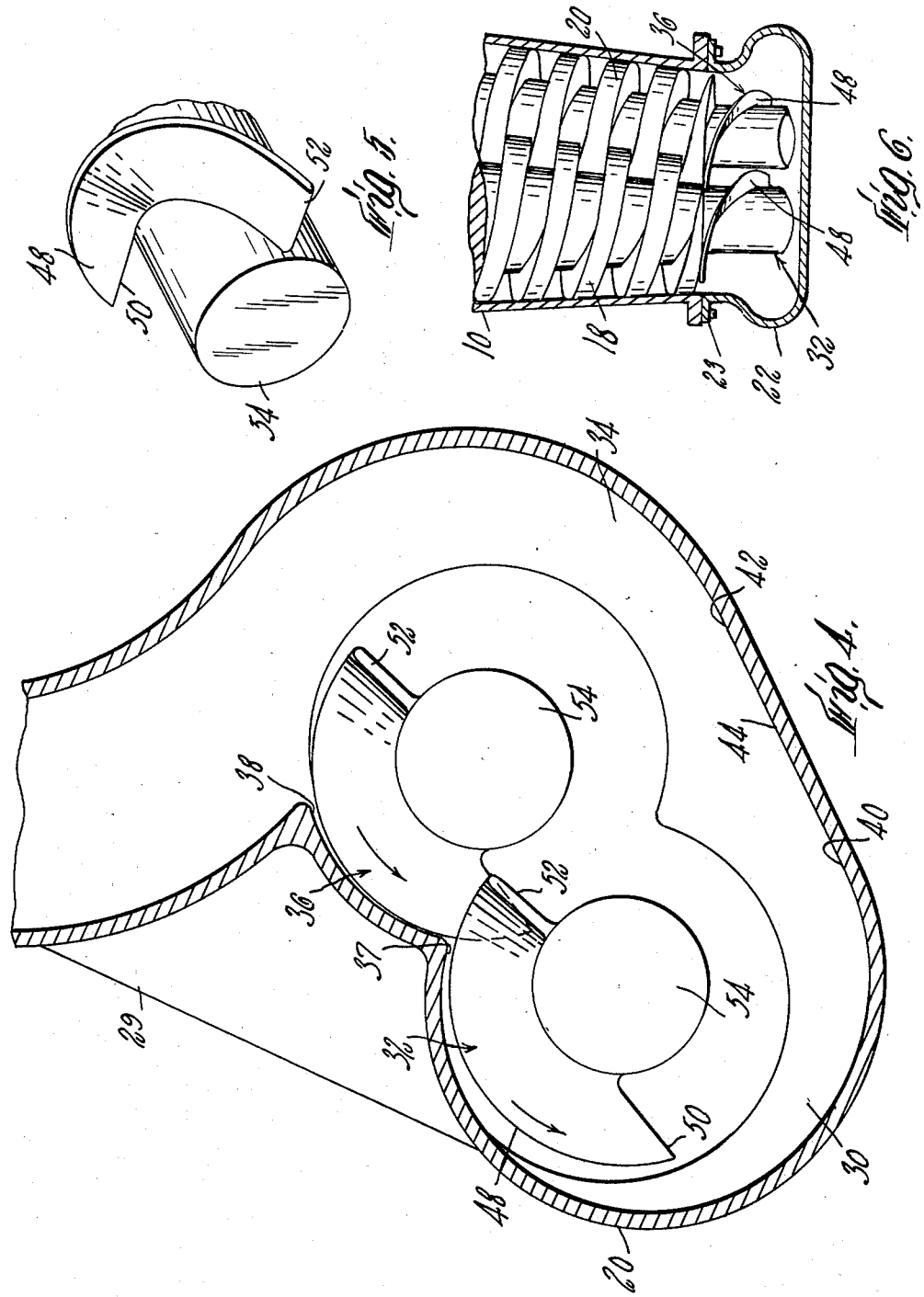

United States Patent Office 2,939,745
Patented June 7, 1960

2,939,745

DISCHARGE APPARATUS

Lawrence A. Carlsmith, Amherst, and Oscar Luthi, Nashua, N.H., assignors to Improved Machinery, Inc., Nashua, N.H., a corporation of Maine Filed July 2, 1958, Ser. No. 746,293

6 Claims. (Cl. 302—14)

This invention relates to pumping apparatus and more particularly to discharge devices especially useful for cooperation with pumps of the intermeshing screw type.

Pumps utilizing intermeshing screws are useful for the transportation of a variety of mixtures, such as wood chips and water. Such mixtures are difficult to transport and have great tendency to clog in the conduit or pipe whenever an obstruction occurs along the interior surface thereof, such as for example, when the cross-sectional area is decreased. Nevertheless, pumps suitable for such applications have been built and operated successfully, as for example, the type disclosed in application U.S. patent Serial No. 631,577, filed December 31, 1956, now Patent No. 2,908,226 granted Ooctober 13, 1959, in the name of John P. Rich et al.; entitled "Intermeshing Screw Pumps and the Like" and assigned to the assignee of the present application. The handling of the mixture at the discharge of the pump, however, has produced certain problems and difficulties as frequently it is necessary that the pump discharge into a pipe having a cross-section area less than that of the rotor ends such that the resulting restriction almost inevitably produces clogging.

Accordingly, it is a primary object of this invention to provide an improved means for transferring the pumped material from the discharge area of the rotors of an intermeshing screw type of pump to a conventional pipe or the like.

The preferred structure of the invention embodies an appropriately designed vane mounted adjacent each rotor of the pump at its discharge end with each vane being positioned within a casing portion of generally volute configuration. A transition passageway is provided between the volute portions and the discharge pipe. The clearing vanes are driven by the pump shafts and act to transport the mixture through the increasing area of the volute portions into the passageway and discharge conduit. In this manner, the structure insures that the pumped mixture is continually moved forward within the discharge casing such that clogging or other interference during the transition period of discharge does not occur. Other objects and advantages of the invention, together with features thereof, will become apparent as the description of the preferred embodiment of the invention, taken in conjunction with the drawings, progresses.

In the drawings:

Fig. 1 is a side view, in partial section, of an intermeshing screw pump including the preferred embodiment of a discharge apparatus which incorporates the principles of the invention;

Fig. 2 is a view from the discharge end of the screw type pump, showing the outer configuration of the discharge casing;

Fig. 3 is a top view of the discharge casing structure;

Fig. 4 is a sectional view along the line 4—4 of Fig. 1 showing the interrelationships between the clearing vanes and the discharge casing;

Fig. 5 is a perspective view of a clearing vane structure; and

Fig. 6 is a sectional view along the line 6—6 of Fig. 1 showing the vanes within the discharge casing positioned adjacent the ends of the pump rotors, the vanes and rotors being shown in elevation.

With reference to Fig. 1, the casing 10 of the intermeshing screw-type pump houses two rotor shafts 12, 14. The particular pump illustrated is of the type described in the aforementioned copending application Serial No. 631,577, its shafts being disposed at skew angles to one another. The invention is suitable for practice with other types of intermeshing screw pumps, however. In this particular pump, the chip mixture or other material to be pumped is introduced through inlet 16 and is forced through the pump by coaction of screw members 18, 20, mounted on the shaft 12, 14 respectively, with the walls of the pump casing. The shafts 12, 14 rotate in the same direction thus transporting the mixture through the casing. The screw threads of the members 18, 20 are designed such that the back leakage path between the interacting portions thereof is negligible. The mixture is pumped through the pump casing 10 by the rotors and into the discharge casing 22.

The discharge casing is a housing portion which is secured to the discharge end of the pump by means of bolted flanges 23. It provides a transition between the pump and the outlet conduit 24. The latter is connected to the casing by means of flanges 26 and 28 which are bolted together. The general exterior configuration of the discharge casing may be seen in Figs. 2 and 3.

This discharge conduit 24 is shown disposed vertically with respect to a pump mounted on a horizontal base as shown in Fig. 1. The position of the discharge may be varied as desired commensurate with the application of the equipment. A web member 29 is provided to increase the rigidity of the flanged portion of the discharge casing.

The interior of the discharge casing is formed to provide two intermeshing "volutes" in the preferred embodiment, a first "volute" 30 which cooperated with a corresponding rotating vane structure 32 and a second "volute" 34 which cooperates with a second vane structure 36. The "volutes" are dimensioned in an interrelated manner and each "volute" is positioned in a similar manner relative to its vane, as may be seen in Fig. 4. The "volutes" are designed such that points of corresponding equal radii are positioned at substantially the same angle relative to the associated vane as viewed in Fig. 4. The radii of "volutes" increase at equal rates in the direction of rotation of the vanes. The smallest radius of volute 30 is at point 37 and the smallest radius of volute 34 is at point 38. At corresponding points 40 and 42 the volutes are of equal diameter. A straight portion 44 connects the two volutes 30, 34 between these points such that the volute configuration of the casing 20 is modified as in this area the volute 30 commences to intermesh with the volute 34. This portion is a smooth straight wall between points 40 and 42 such that interference with flow is minimized. The volute 34 continues to increase in radius from point 42 to junction with a transition portion 46 which is connected to the discharge conduit 24.

Positioned within the discharge casing are the two substantially identical clearing vane structures 32, 36 which are positioned relative to the ends of the shafts 12, 14 respectively as extensions thereof as may be seen in Figs. 1 and 6. Each vane structure includes a smoothly curved vane member 48 of gradually decreasing radius from leading edge 50 to trailing edge 52. The vane is positioned on its hub 54 such that its leading edge is adjacent the end of the associated pump rotor shaft and its trailing edge is on the opposite or outer end of the hub. Each vane is developed in a smooth curve across substantially the entire length of the hub. The relationship of these elements may be better understood with reference to Fig. 5. The corresponding portions of the vane structures as shown in Figs. 4 and 6 are identified with the same reference numerals.

In operation, pumped material is discharged from the pump rotors onto the clearing vanes within the discharge casing 22. Each vane operates to move pumped material in an outward direction parallel to the axis of the rotor shaft and in addition in a direction along the interior of the casing as defined by the volutes. This direction of travel of the pumped material is indicated generally by the arrows (Fig. 4). The material is moved smoothly and easily through the discharge transition member into the discharge conduit. Due to the open design of the vanes there is little or no tendency for any interference due to flow in a reverse direction at the intermeshing point between the two vanes. Thus, the transition from pump to discharge conduit is accomplished without clogging. The vanes, in their continuous rotation, tend to maintain all the surfaces in clear condition such that the continuous unobstructed flow is assured.

Although a preferred embodiment of the invention has been shown and described, certain modifications thereof will be obvious to those skilled in the art and it is not intended that the invention be limited thereto or to details thereof, and departures may be made therefrom within the spirit and scope of the invention as defined in the following claims.

We claim:

1. In combination with a pump of the intermeshing screw type adapted for pumping mixtures of wood chips and water and the like, said pump having a housing, two generally parallel pump shafts which rotate in the same direction mounted within said housing and a discharge port in said housing through which said pump shafts extend, a discharge apparatus adapted to be mounted on said pump housing in communication with the discharge port of said pump such that said pump shafts extend into said discharge apparatus, said discharge apparatus being adapted to convert the flow of mixtures from pump discharge port which is substantially parallel to the axes of rotation of said pump shafts to a flow direction substantially perpendicular to said axes of rotation, comprising a discharge casing having an inlet disposed in communication with said discharge port and an outlet disposed perpendicularly to said inlet and adapted to be connected to a suitable conduit, and two rotor structures mounted within said casing, each rotor structure being adapted to be driven in rotation by a cooperating one of said pump shafts, each said rotor structure including a hub and a vane extending outwardly from said hub in a direction generally perpendicular to the axis of rotation of the associated rotor, said casing having a chamber portion of interior configuration which defines about each rotor, at least in part, a chamber of gradually increasing radius about the axis of rotation of the associated rotor.

2. The discharge apparatus as claimed in claim 1 wherein said rotor structures are mounted side by side such that their vanes overlap in rotation and the casing chamber portion associated with one of said rotors merges in a smooth transition with the casing chamber portion associated with the second rotor, said casing chamber being arranged so that the flow passageway generally increases in volume from said casing inlet to said casing outlet.

3. The discharge apparatus as claimed in claim 1 wherein each said vane is a smoothly curved member which extends over approximately one-half the circumference of the hub and which has a leading edge and a trailing edge, the periphery of said vane defining a gradually decreasing radius from said leading edge to said trailing edge and said trailing edge being disposed at a greater distance from said discharge port than said leading edge.

4. The discharge apparatus as claimed in claim 1 wherein said casing chamber portions are positioned relative to one another such that pumped material is fed between them and said casing includes a smooth transition portion between the said chamber portions.

5. The discharge apparatus as claimed in claim 1 wherein said casing chamber portions are positioned in intermeshing relationship and said vane structures are positioned to overlap one another in operation.

6. The discharge apparatus as claimed in claim 1 wherein said vane structures are substantially identical and said casing chamber portions include correspondingly positioned sections of equal radii.

References Cited in the file of this patent

UNITED STATES PATENTS

| | | |
|---|---|---|
| 395,956 | Day | Jan. 8, 1889 |
| 612,304 | Blazer | Oct. 11, 1898 |
| 1,991,541 | Cannizzaro | Feb. 19, 1935 |
| 2,369,539 | Delamere | Feb. 13, 1945 |
| 2,474,653 | Boestad | June 28, 1949 |
| 2,620,968 | Nilsson | Dec. 9, 1952 |
| 2,642,003 | Whitfield | June 16, 1953 |
| 2,652,192 | Chilton | Sept. 15, 1953 |